United States Patent [19]

Tanaka et al.

[11] Patent Number: 4,758,213
[45] Date of Patent: Jul. 19, 1988

[54] ANTISTATIC DRIVING BELT

[75] Inventors: Hiroyuki Tanaka; Kyoichi Mishima, both of Hyogo, Japan

[73] Assignee: Mitsuboshi Belting Ltd., Japan

[21] Appl. No.: 846,677

[22] Filed: Apr. 1, 1986

[30] Foreign Application Priority Data

Apr. 1, 1985 [JP] Japan .............................. 60-48805[U]

[51] Int. Cl.$^4$ ........................... F16G 5/04; F16G 5/20
[52] U.S. Cl. .................................... 474/264; 474/265; 474/271
[58] Field of Search ................. 474/264, 265, 268, 271

[56] References Cited

U.S. PATENT DOCUMENTS 4,024,773  5/1977  Hartman et al. ..................... 474/263
4,299,588 11/1981  Standley ............................. 474/264
4,518,376  5/1985  Mashimo et al. ............... 474/260 X Primary Examiner—George A. Suchfield
Attorney, Agent, or Firm—Sughrue, Mion, Zinn, Macpeak and Seas

[57] ABSTRACT

An antistatic driving belt having a durable destaticizing function and long surface life. A cushion rubber layer is disposed between a tension rubber layer and a compression rubber layer, and tension members are buried in the cushion rubber layer. A layer of conductive rubber blended with conductive material and having a high abrasion resistance is arranged on the underside of the cushion rubber layer. The ends of the layer of conductive rubber are exposed on both sides of the belt. Preferably, the conductive rubber layer is formed of rubber containing 5 to 50 parts by weight of conductive material to 100 parts by weight of rubber. The conductive rubber layer should be 0.1 mm or thicker, and should have a thickness less than half the total thickness of the compression layer.

5 Claims, 1 Drawing Sheet

ANTISTATIC DRIVING BELT

BACKGROUND OF THE INVENTION

The present invention relates to improvements in destaticized driving belts.

Driving belts such as V-belts and timing belts are normally manufactured from rubber or high polymer compounds. When such a belt is being run, due to slippage on the pulleys on which it is run, the belt has a tendency to become charged with static electricity As a consequence, there is a danger of receiving a strong electric shock if the belt is touched.

There have heretofore been employed various techniques for preventing such a belt from being charged with electricity. These include the following: (1) conductive powder is adhesion-bonded to tension members, or metal foils are wound on their outer surfaces (Japanese Utility Model No. 18032/1975); (2) highly conductive woven fabrics are arranged on outer belt faces (Japanese Patent Laid-Open Pat. Appln. No. 63150/1981); and (3) carbon powder is applied to the belt sides, or members constituting the belt side face are made to contain carbon powder (Japanese Laid-Open Pat. Appln. No. 124563/1977).

However, those techniques have disadvantages.

These include, in the case of (1), an uncertain charging preventive effect due to variations in the coil pitch of the tension member, low adhesion between the tension member and the rubber, reduction of the life of the belt because of the low adhesion between the tension member and the rubber when metal foil is wound thereon, and difficulties in carrying out foil-winding operations and unsatisfactory results thereof; in the case of (2), i.e., coating outer layers with woven fabrics, problems related to the strength of woven fabrics and attendant high costs; and further, in the case of (3), a fast reduction in the conductive function resulting from scattering of carbon powder while the belt running.

On the other hand, use has been made of conductive powders such as carbon, graphite or copper in the form of powder blended with a rubber component of, for example, a compressed layer (14), as shown in FIG. 1. However, such use of conductive powder has been proved not only disadvantageous but also unsatisfactory in that the dispersion properties are reduced as the quantity of additive increases, and the mechanical properties of rubber are adversely affected. With respect to destaticization of a belt of this type, there is another disadvantage in that, although the conductive rubber layer functions properly as a destaticizer while the belt is new, the conductive rubber layer rapidly wears out and ultimately stops functioning as a destaticizer.

The difference in abrasion is mainly due the fact that the driving belt is composed of different rubber materials, whereby the conductive rubber forming the compressed rubber layer 14 wears faster than that of the tension layer 13 or the cushion rubber 12 of the tension member layer. As a consequence, the destaticizing function will be eliminated if the belt starts floating on the pulley and the flange and fails to come in contact with the belt.

SUMMARY OF THE INVENTION

In view of the foregoing, the present invention is intended to eliminate such drawbacks as abrasion wear of the conductive rubber layer, and it is therefore an object of the invention to provide a belt having a durable destaticizing function by reducing the abrasion of the conductive rubber layer below that of the tension and compression layers so as to thereby make the abrasion uniform.

In order to accomplish the above-described object according to the present invention, a destaticizing driving belt is provided having a cushion rubber layer disposed between a tension rubber layer and a compression rubber layer, tension members buried in the cushion rubber layer, and a layer of conductive rubber blended with conductive material and having excellent abrasion resistance at least on the underside of the cushion rubber layer and with the ends of the layer of conductive rubber being exposed on the belt sides.

The conductive rubber layer according to the present invention is prepared from 5 to 50, more preferably 20 to 40, parts by weight of a conductive material, e.g., conductive carbon black, metallic powder, metalic fibers or conductive organic fibers, to 100 parts by weight of single-material natural rubber (NR), styrenebutadiene rubber (SBR), chloroprene rubber (CR) or nitrile-butadiene rubber (NBR), or a blend of thereof, and including a plasticizer, a vulcanizer and a vulcanization enhancer. The conductive rubber layer is normally in the form of a sheet 0.1 mm or thicker, preferably 0.6 to 2.0 mm, and has a thickness less than half the total thickness of the compression rubber layer.

Further, the conductive rubber layer should have a thickness at least 0.1 mm and at most equal to the total thickness of the tension rubber layer.

It is preferred to employ not less than 5 parts or more than 50 parts by weight of the conductive material because a desired conductivity cannot be obtained in the case of the former, whereas there is no improvement of conductivity but with increased cost.

If the conductive rubber layer is 0.1 mm or thinner, contact failure with the pulley may result, and, if its thickness greater than half that of the compression rubber layer, the cost of the belt is increased without an offsetting improvement in desired properties.

The abrasion wear of the conductive rubber layer tested by the method provided for in the Steel Cord Conveyer Belt Cover Rubber Abrasion Test JIS K 6369 should be $-90$ to 0%, preferably $-60$ to $-20$%, of that of the tension rubber layer; in other words, the layers on and above the conductive rubber layer are caused to wear faster so as to prevent the belt from floating on the pulley and the flange and hence prevent contact failure. The abrasion wear of the conductive rubber layer should also be $-90$ to 0%, preferably $-60$ to $-20$%, of that of the compression rubber layer to ensure that it can hold its destaticizing function by always making contact with the pulley and the flange regardless of the progress of abrasion of the compression layer.

The present invention is applicable to various belts such as banded belts, multiple belts, V-ribbed belts, plain belts, and toothed belts in addition to driving V-belts with cogs.

DESCRIPTION OF THE PREFERRED EMBODIMENTS

Referring now to the accompanying drawings, a preferred embodiment of the present invention will be described.

Figure 2:
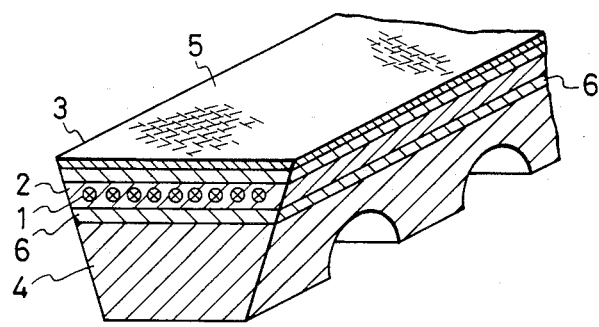
FIG. 2 is a perspective view of a V-belt with cogs embodying the present invention.

FIG. 2 shows an example of a V-belt with cogs as an example of a belt constructed according to the present invention. The V-belt includes tension members 1 prepared from low elongation and high strength natural or synthetic fibers with a thin cushion rubber layer 2 bonded to the upper and lower faces thereof, a tension layer 3, and a compression rubber layer 4 laid in the stated order on and under the cushion rubber layer 2. The surface of the tension rubber layer 3 is covered with canvas 5.

In the driving belt thus constructed, a thin conductive rubber layer 6, essential to the present invention, is buried underside the cushion rubber layer 2, i.e., between the cushion rubber layer 2 and the compression rubber layer 4, and the ends thereof are exposed on the belt sides.

Figure 1:
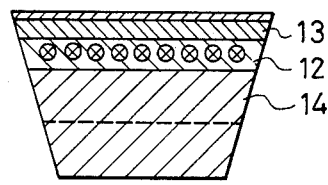
FIG. 1 is a transverse sectional view of a conventional V-belt with cogs.

In order to demonstrate the effects of the driving belt embodying the present invention as shown in FIG. 2, a driving belt having a conductive rubber layer 0.8 mm thick and a conventional driving belt as shown in FIG. 1 having a compression layer composed of a conductive rubber layer and being less abrasion resistant (amount of abrasion: 136 cc) were driven and their electric resistivities (/100 mm, 500V) were measured after use. Table 1 shows the measured results.

TABLE 1

|  | Belt according to Present Invention | Conventional Belt |
|---|---|---|
| Before Use | $15 \times 10^4$ | $15 \times 10^4$ |
| At end of normal service life | $20 \times 10^4$ | $8 \times 10^6$ |

The measurements were made according to the Japan Electric Engineering Standards, i.e., a 500 V megger was used to measure the resistivity of the belts, which were 100 mm long.

Table 2 indicates the blends used to form the conductive layer and abrasion volume of the belt according to the present invention. Table 3 indicates the blends used to form the compression and tension rubber layers and abrasion volume of the belt of the present invention.

TABLE 2

| Blend | Part by Weight |
|---|---|
| Chloroprene rubber | 100 |
| Zinc Oxide | 4 |
| Magnesium Oxide | 5 |
| Stearic Acid | 2 |
| Carbon N-330 | 50 |
| Sulfur | 2 |
| Accelerator DM | 1 |
| Oil | 5 |
| Fiber | 10 |
| Acetylene Black | 30 |
| Abrasion Volume | 83 (cc) |

TABLE 3

| Blend | Part by Weight |
|---|---|
| Chloroprene rubber | 100 |
| Zinc Oxide | 4 |
| Magnesium Oxide | 5 |
| Stearic Acid | 2 |
| Carbon N-330 | 50 |
| Sulfur | 2 |
| Accelerator DM | 1 |
| Oil | 5 |
| Fiber | 10 |
| Abrasion Volume | 122 (cc) |

Figure 3:
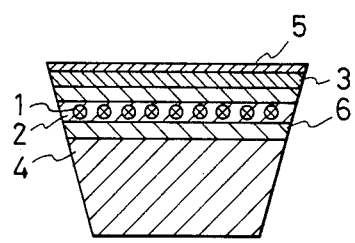
FIG. 3 is a transverse sectional view of another embodiment of the present invention.

Another embodiment of the present invention is shown in FIG. 3. A V-belt with cogs in FIG. 3 has the thinner conductive rubber layers 6 sandwich a cushion rubber layer 2, and both edges of the layers 6 are exposed. As set forth above, an excellent abrasion resistant conductive rubber layer is joined to the underside of the cushion layer containing the tension members, both ends of the former layer are exposed on the belt sides, and the abrasion resistance of the conductive rubber layer is made as high as that of the tension rubber layer and the compression rubber layer, whereby the abrasion wear as a whole of the belt is made uniform. The destaticizing function of the driving belt can thus satisfactorily be maintained throughout the normal lifetime of the belt while providing a reduced production cost.

We claim:

1. In an antistatic driving belt having a cushion rubber layer disposed between a tension rubber layer and a compression rubber layer, tension members being buried in said cushion rubber layer, the improvement comprising: a layer of conductive rubber blended with conductive material and having a high abrasion resistance arranged at least on an underside of said cushion rubber layer, ends of said layer of conductive rubber being exposed on both sides, and the abrasion resistance of said conductive rubber layer is higher than that of said tension and compression layers.

2. The antistatic driving belt as claimed in claim 1, wherein said conductive rubber layer is prepared from rubber containing 5 to 50 parts by weight of conductive material to 100 parts by weight of rubber.

3. The antistatic driving belt as claimed in claim 1, wherein a thickness of said conductive rubber layer of said compression rubber layer is 0.1 mm or more but less than half of the total thickness of said compression layer.

4. The antistatic driving belt as claimed in claim 1, wherein said conductive rubber layer of said tension rubber layer is 0.1 mm or thicker.

5. The antistatic driving belt as claimed in claim 1, wherein said conductive material is selected from the group consisting of conductive carbon black, metallic powder, metallic fibers and conductive organic fibers.

* * * * *